United States Patent [19]

Hughes

[11] E Re. 28,583

[45] Reissued Oct. 28, 1975

[54] SEMI-SPLIT SHAKE

[76] Inventor: John H. Hughes, P.O. Box 82, Aberdeen, Wash. 98520

[22] Filed: Mar. 7, 1969

[21] Appl. No.: 817,219

Related U.S. Patent Documents

Reissue of:

[64] Patent No.: 3,315,717
Issued: Apr. 25, 1967
Appl. No.: 426,254
Filed: Jan. 18, 1965

[52] U.S. Cl. ..... 52/560; 52/316; 52/741; 144/326; 144/13; 83/4

[51] Int. Cl. ..... B27m 3/02; E04d 1/20

[58] Field of Search ..... 144/326, 13; 83/4; 52/560, 52/316, 741

[56] References Cited

UNITED STATES PATENTS 1,785,830 12/1930 Davis ..... 144/326

3,396,764 8/1968 Ferguson ..... 144/326

*Primary Examiner*—Donald R. Schran

EXEMPLARY CLAIM

1. The method of making a semi-split shake of the character described comprising providing a shake bolt of predetermined length, directing a dividing cut into the bolt transversely thereacross at a distance from one end of the bolt equal to the length of the weather end portions of the shake to be made, and at a sharp acute angle toward the opposite end of the bolt, terminating said cut at a corresponding distance from the opposite end of the bolt, then reversing the direction of the cut and continuing it at the same downward angle and to the same length as the first cut, then splitting the weather end portion of the shake from and as defined between the spaced ends of said angular cuts, from the bolt.

15 Claims, 8 Drawing Figures

JOHN H. HUGHES
INVENTOR.

BY Seed & Berry

ATTORNEYS

JOHN H. HUGHES
INVENTOR.

BY Seed & Berry

ATTORNEYS

SEMI-SPLIT SHAKE

Matter enclosed in heavy brackets [ ] appears in the original patent but forms no part of this reissue specification; matter printed in italics indicates the additions made by reissue.

---

This invention relates to a method of producing shakes, and especially a shake which is semi-split in the sense that the same is partially sawed with only a part of its side faces having the ribbed appearance with natural cleavage gives to a shake when the same is split from a shake bolt. Noting that the term "semi-split" as applied to a shake is commonly understood to mean a shake having its upper face ribbed and its underside sawed flat, it is here pointed out that it is only for lack of a better term that I refer to the product of the present method as a semi-split shake. My product is characterized in that its thick or butt end is ribbed on the underside as well as the top face. Thus, with such thick butt laid to the weather when the shakes are applied in lapped rows upon the roof or a side wall of a building, the exposed end of each shake has along both its upper and its lower edge the rustic irregularly ribbed profile which is considered to give to a shake its most desirable appearance.

The present invention looks to a method by which a shake of the above-described character may be produced with ease and expedition. This is accomplished by (1) sawing from a shake bolt a shake block, with the sawing so performed by a double-edged power-driven band-saw as to progressively trace the oppositely directed runs of a zig-zag path giving to one end of the block a multitoothed profile configuration in which the produced notches are deeply indented and V-shaped and with the flanking walls steeply inclined from the end face, and (2) introducing a wedging knife into each of the several notches and forcefully driving the same inwardly to cause shakes to be split by natural cleavage from the block. In the preferred method the length of the bolts in which said zig-zag sawing is performed have a length moderately less than twice the length of the shakes which are to be produced. The zig-zag saw-cut is located central to the length of the bolt and is performed either by an interrupted succession of oppositely directed runs, after each of which a shake is split from the bolt, or in one continuous cut entering at one side face of the bolt and emerging from the other side face so that two separate and more or less identical shake blocks—each with a saw-toothed end profile—are obtained.

In accomplishing the above mentioned and other objects of the invention, I have provided the improved details of shake manufacture, the preferred forms of which are illustrated in the accompanying drawings, wherein.

Figure 2:
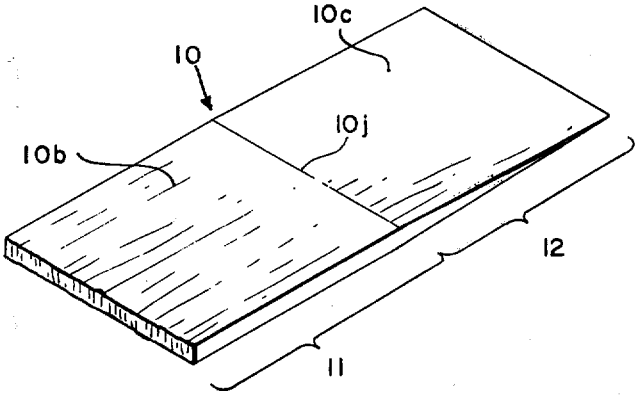
FIG. 2 is a perspective view of one of the semi-split shakes of the present invention.

Referring more in detail to the drawings:

In FIG. 2 I have shown what has been designated the "preferred form" of semi-split shakes of this invention. This particular shake is designated in its entirety by reference numeral 10. It is shown to comprise a weather end or butt end portion 10b, spanned by bracket 11 and a sawed tip end portion 10c spanned by bracket 12; these two bracketed portions being here shown to be of approximately the same length. However, the tip end is ordinarily made somewhat longer than the weather end for various reasons including that of giving better coverage when laid in courses on a surface.

It is to be understood that shakes of any practical or desired proportions can be made by the present method. Present usage, however, calls for a shake with a tapered tip end portion somewhat longer than the weather end portion. The proportion of lengths of tip and weather portions may vary to more or less extent as may be desired.

Figure 1:
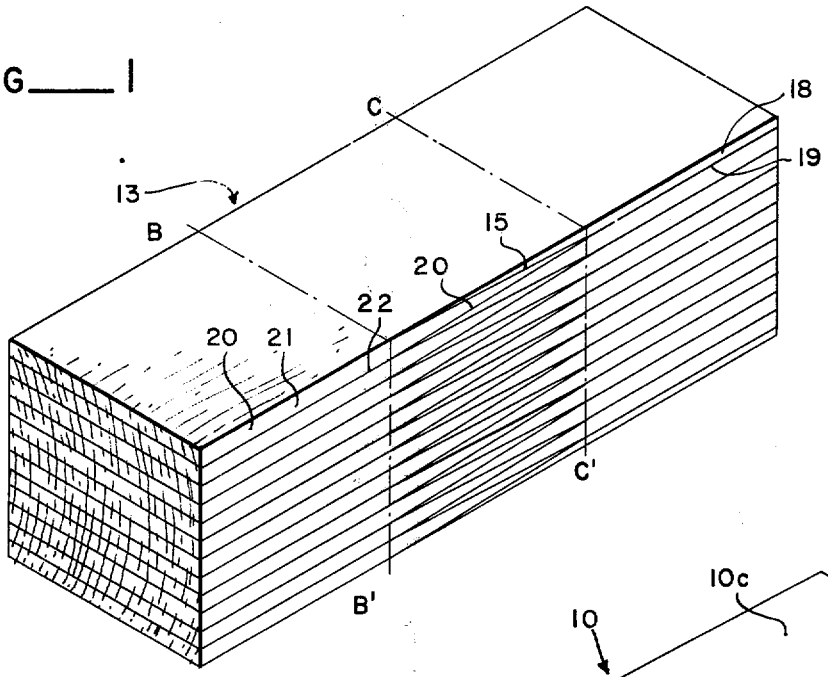
FIG. 1 is a perspective view of a shake bolt, from which semi-split shakes may be produced in accordance with the method of manufacture herein disclosed.
Figure 5:
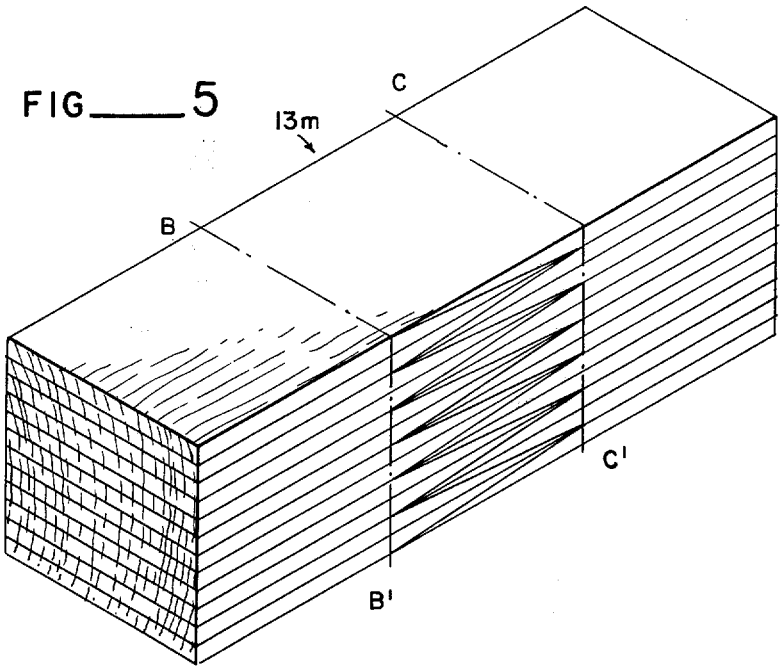
FIG. 5 is a perspective view of a shake bolt from which shakes of this invention may be produced by an alternative method.

In FIG. 1, a shake bolt or block from which shakes of this invention may be made, is designated in its entirety by reference numeral 13. Such a shake bolt would be of a predetermined length but its other dimensions would be limited only by the equipment used in its manufacture and the method of manufacture employed. The bolts, as shown both in FIGS. 1 and 5 are cut to the form of a rectangular parallelpiped which in the drawings have been lined for explanatory purposes only. In the actual shakemaking operation, no lining as shown either in FIGS. 1 or 5 is used. It is to be understood that these bolts 13 have parallel, sawed opposite end surfaces but would be prepared in a manner not unlike the general practice of providing shake bolts.

For explanatory purposes, let it be assumed that the bolt 13 is trisected, or approximately trisected, by imaginary lines B and C on the top face and meeting lines B′ and C′ on the flanking faces. The distance between these lines and the related end face of the bolt establishes the length of the weather end portion 10b of the shakes made from the bolt and the distance between the lines determines the length of the tip end portions of the shakes to be formed from the bolt.

In the making of blocks from which the semi-split shakes are obtained, the hereinbefore-mentioned continuous zig-zag saw-cut is performed upon the bolt in such a manner that a first run of the cut enters on the line B, travelling a path working inwardly on the plane only moderately inclined from the top face of the bolt until the cut reaches the transverse vertical plane occupied by the lines C and C′, whereupon the directional travel—progress considered—is reversed and a second run is then made, still working inwardly on a biased plane, with this second run terminating when the cut reaches the transverse vertical plane occupied by the lines B and B′. At such termination of the second run, a third run is performed and then a fourth run, the former paralleling the first run and the latter paralleling the second run. Considering each pair of meeting runs as a cycle, the sawing continues with a succession of such repeating cycles until the bandsaw emerges from the bottom face of the bolt, having divided the bolt into two more or less identical blocks having a saw-toothed profile upon one end. Splitting of the shakes from the bolts is performed by driving a broad flat-bladed knife into the blocks, introducing same in each of the notches which the toothed profile provides.

Figure 3:
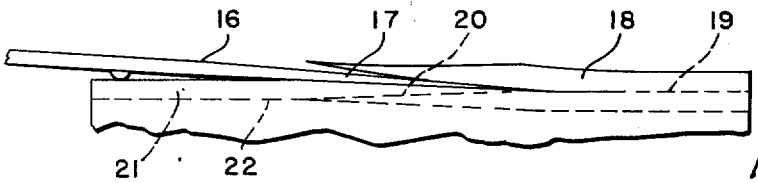
FIG. 3 is a view illustrating a tool for and the manner of its use in splitting the weather end portion of a shake from a shake block or bolt where the several runs of the zig-zag saw-cut are made interruptedly.
Figure 4:
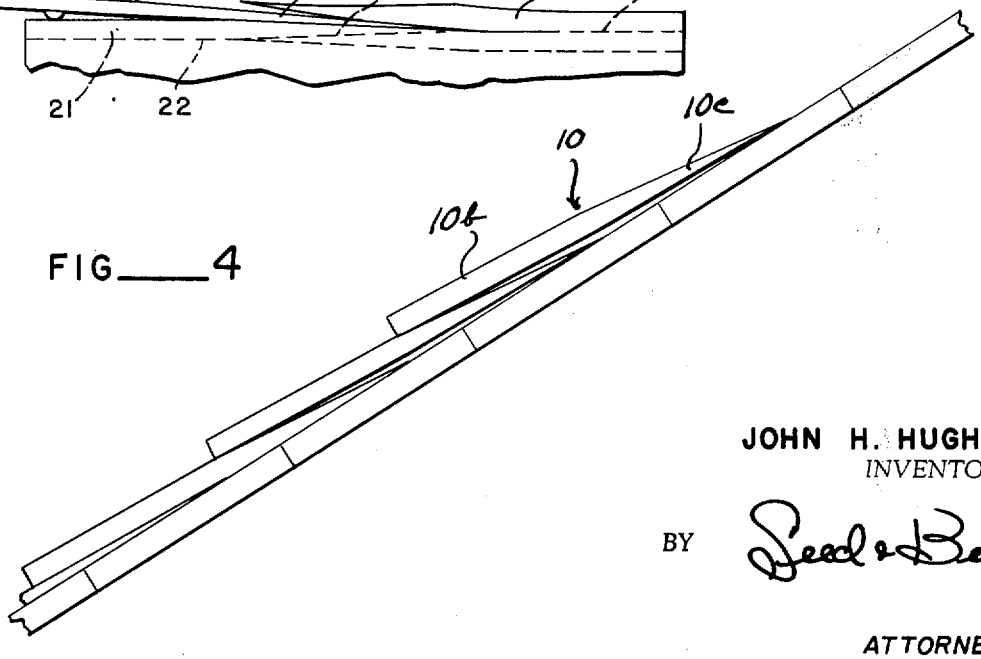
FIG. 4 is a sectional view showing the manner of laying successive courses of the shakes of FIG. 2 on a sheathed roof or side wall surface.

In FIG. 3 I have illustrated a procedure in which the zig-zag cut is interrupted after each of its runs have been made. The interrupted zig-zag cutting, as with a continuous cut, is self-evidently best performed by using a saw. In making an interrupted zig-zag cut, the saw is removed at the completion of each run and the blade 17 of a splitting tool 16 is forced into the open end of the cut and then, by using the tool as a pry, the semi-split shake 18 or 21, depending upon the end of the bolt from which the shake is being obtained, is split free along the natural line of cleavage designated by lines 19 and 22.

Then, with the shake 18 split from the bolt 13, the next cut is caused to enter the bolt along the terminal edge line of the first cut 15 and to advance in a direction opposite that of the first cut 15 and at the same acute angle, along line 20, as marked in FIG. 1, to terminate in the vertical plane of line B–B–B′. Then the cutting tool employed is again removed from the bolt and the splitting tool is applied to the open end of the cut 20 for use in the same manner as before described, and the shake 21 is then split free along line 22 in FIG. 1.

This method of making semi-split shakes provides each with a but end portion having top and bottom split faces, and a tip end portion that is tapered to a thin end edge, and with smooth cut opposite faces. Such shakes may be laid either side up, as desired, because of color, appearance or other reasons, The means used for cutting the zig-zag planes of separation of the tip end portions of successive shakes may be a double edged band saw, a knife or any other suitable form of cutting tool. It is not intended that the method be restricted to the use of any specific form of tool, whether it be a saw, knife or other device. The term "saw" is intended, when used, to include anything suitable for this purpose.

Tips lengths are so proportioned, relative to weather ends, to afford good and effective undercoverage without exposing any of the tip surfaces, permitting all of the split surfaces of the shakes to be exposed to weather and to enhance appearance.

In carrying out an alternative method of semi-split shake shingle manufacture of this invention, the shake bolt 13M of FIG. 5 has ben shown to be lined or marked in the same manner as previously described, for explanatory purposes only, by having imaginary lines B—B′ and C—C′ thereon. Then, in the making of the tip defining cuts for the removal from the bolt of sections such as that designated by numeral 24 in FIG. 6, the converging cuts are formed as before but at a greater angle that will, at their terminal lines, define the thickness of a shake butt end portion sufficient for central division to provide two shakes therefrom.

Figure 6:
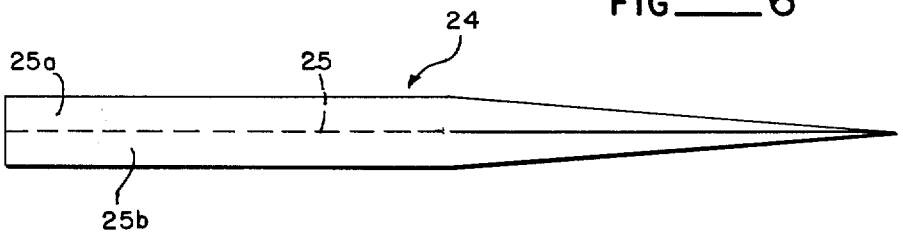
FIGS. 6 and 7 are edge views of sections as cut and split by said alternative method, and showing division lines for production of a plurality of semi-split shakes therefrom.

As shown in FIG. 6, the weather end portion of piece 24, after removal by splitting it free from the bolt 13M along a natural plane of cleavage, may be cut at its tip and split along the line of a plane parallel to and medially of the parallel split surfaces of its weather end portion, this plane being designated by the dash line 25, thus to provide two shake shingles 25a and 25b of like dimensions from section 24. Each of these shakes having both surfaces of its weather end portion presenting the characteristic split surface and the tapered tip presenting smooth flat surfaces.

Figure 7:
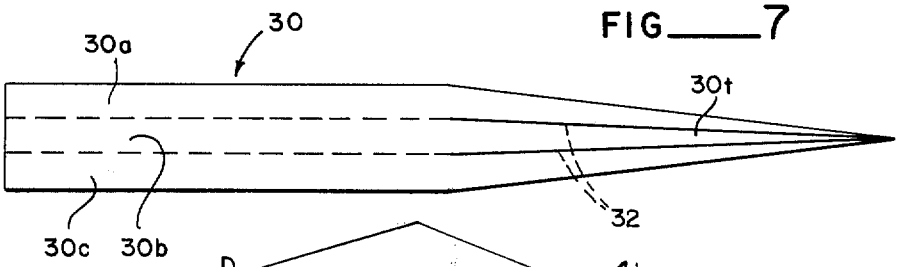

The piece of section 30 of FIG. 7 which has equally beveled surfaces defining the tip 30t between them is removed from the bolt 13M as was previously described in reference to the section 24 of FIG. 6, but the diverging angle of the acute cuts made for its removal is increased sufficiently to define a butt end portion that may be divided to provide three shakes. This division of the piece 30 is made by cuts 32 that are directed into the tip end edge along diverting lines to the extent of the full length of the tip, then the pieces are split apart along natural lines of cleavage, thus to provide three shakes designated at 30a, 30b, 30c, each with its weather end portion formed with split surfaces and its tip portion with cut or sawed surfaces.

Figure 8:
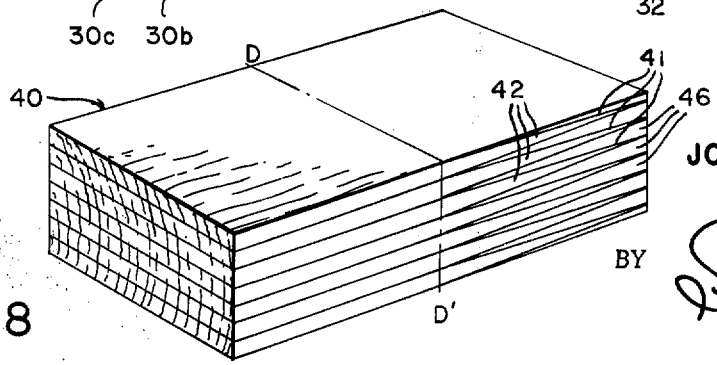
FIG. 8 is a shake bolt indicating how the method may be applied to a bolt of short length to produce therefrom sawed shingles and the semi-split shakes.

A method of shake manufacture, along with an incident production of shingles, is disclosed in FIG. 8, wherein a shingle bolt 40 is shown to have a succession of converging cuts 41 entering the bolt at one end to define the tip end portions 42 of the succession of shakes that are to be split apart in the final operation of shake manufacture from this bolt. The acute angular cuts 41 that define the tip end portions of the shakes between them merge into the vertical plane of lines D–D′.

The wedge shaped sections that are cut free from between adjacent tip end portions of the shakes by converging cuts 41 provide shingles 46 that may be advantageously used as ordinary shingles are used. This method of shake manufacture may be carried on by use of bolts of various sizes and shapes. Only their end surfaces need to be sawn.

An important feature resulting from the various modes of shingle manufacture above disclosed resides in the production of shakes which are of uniform thickness at the line juncture of their weather ends and tip end portions; this being due to the fact that in the splitting apart of the weather end portions, the split starts at the line of convergence of the saw cuts that define the tip end portions of the shakes; this being at the line 10j in FIG. 2.

It is important to understand that when wood is separated by natural cleavage, control of thickness is possible only at the line where cleavage is begun. Therefore, in this operation of shake manufacture, thickness of the butt ends of shakes may vary and the risk of imperfection may increase with increase in the length of the split. Also, imperfections are most serious if they occur at that line of exposure where water or other abrasive substances drop on the shake, as for example, from the butt end of one onto the surface of a shake in the next lower course. In view of this fact, an important feature of this invention is that the origin of the split of the weather end portion of each shake begins at the juncture of its tip and weather end portion, as for example, at the line 10j applied to the shake 10, as shown in FIG. 2. Thus, providing maximum weather protection at this most critical line of exposure. The splitting of the shakes from the shake bolt from the planes of the lines B–B′ and C–C′ as applied in FIG. 1 is the best assurance of uniformity at this line.

What I claimed as new is:

1. The method of making a semi-split shake of the character described comprising providing a shake bolt of predetermined length, directing a dividing cut into the bolt transversely thereacross at a distance from one end of the bolt equal to the length of the weather end portions of the shake to be made, and at a sharp acute angle toward the opposite end of the bolt, terminating said cut at a corresponding distance from the opposite end of the bolt, then reversing the direction of the cut and continuing it at the same downward angle and to the same length as the first cut, then splitting the weather end portion of the shake from and as defined between the spaced ends of said angular cuts, from the bolt.

2. The method of making semi-split shakes of the character described, comprising providing a shake bolt having a length equal to approximately twice the length of the weather end portions of shakes to be made plus the predetermined length of the tip portions, directing a continuous cut into the bolt transversely of its top surface at a distance from one end of the bolt equal to the length of the weather end portion of the shakes to be made and at an acute angle, and terminating said angular cut at a corresponding distance from the opposite end of the bolt, then reversing the direction and downward angle of the cut and continuing it to the extent of the first angular cut, then continuing the cut in the same zig-zag direction downwardly through the block, and successively splitting the weather end portions of the shakes from and as defined, between successive intersecting cuts, from the bolt.

3. The method of making semi-split shakes of the character described comprising providing a shake bolt of predetermined length, forming a continuous zig-zag cut across the bolt, spanning its medial portion and extending from one face to its opposite face, thus to define the tapered tip end portions of a succession of oppositely directed shakes, then splitting the weather end portions of the shakes from the bolt, starting the splits from the lines of convergence of the tip defining cuts.

4. The method of making semi-split shakes from a shake bolt, comprising cutting into the bolt to define the tapered tip end portion of a section of the shake bolt between two diverging cut surfaces, then splitting the section from the bolt by natural cleavage of the wood from the terminal ends of the diverging ends of the cuts, then dividing the tip portion of the removed section by diverging cut starting from the tip edge of the removed section and extending the length of said tip portion, then splitting the section from the terminal ends of said last mentioned diverging cuts.

5. The method of making a semi-split shake from a shake bolt comprising cutting into and across the shake bolt at an acute angle to an extent to establish a predetermined tip length, then splitting the weather end portion of the shake from the bolt by starting the split at the inner end of the angular cut and continuing the split at the end of the bolt.

6. The method of making a plurality of semi-split shakes from a shake bolt comprising cutting of continuous zig-zag cut across and through the bolt between its top and bottom faces, thus to define the tapered tip end portions of a succession of shakes, then successively splitting the weather end portions of the shakes free from the bolt by splits starting from the merging lines of the oppositely directed cuts and continuing them to the ends of the bolts along natural planes of cleavage thus to provide each shake with a smooth tapered tip and a weather end with split top and bottom surfaces.

7. The method of producing shakes from a shake bolt, and employing in the processing a narrow power-driven double-edged saw blade performing its cutting function by travel endwise to its length, comprising dividing the bolt into two blocks by so correlating the bolt to the powered saw blade that the latter cuts in a center section of the bolt a zig-zag kerf in which the cut enters the bolt at one side face of the bolt and emerges from the opposite face and in its traversal of the bolt places alternate runs of the zig-zag pattern in equidistant paralleling relation on planes biased from side faces of the bolt, and obtaining the shakes by splitting the blocks in a manner causing each split to work by natural cleavage along a respective plane generally paralleling said side faces of the block originating at the apex of a respective one of the several re-entrant angles which the zig-zag cutting produced.

*8. A semi-split shake comprising a tip end portion having cut top and bottom surfaces, and a weather end portion having top and bottom surfaces formed by natural cleavage commenced at the juncture of the tip end and weather end portions.*

*9. A semi-split shake according to claim 8 wherein the top and bottom surfaces of the tip end portion are formed by cutting into and across a shake bolt at an acute angle.*

*10. A semi-split shake according to claim 8 wherein at least one of the tip end portion surfaces forms an obtuse angle with the respective surface of weather end portion at the juncture therebetween.*

*11. Shakes manufactured from a shake bolt by the process of making a plurality of cuts into and across the shake bolt to an extent to establish predetermined tip lengths, and splitting the weather end portions of the shakes from the bolt by starting the splits at the inner ends of the cuts and continuing the splits to the end of the bolt.*

*12. Shakes defined by claim 11 wherein each such shake comprises a tip end portion having cut top and bottom surfaces, and a weather end portion having top and bottom surfaces formed by natural cleavage commencing at the juncture of the tip end and weather end portions.*

*13. The method of making a plurality of shakes from a shake bolt having opposite ends each having a length and a width and grain running between said opposite ends, each shake having opposite sides cut to define a tip portion extending to an inner end and a split weather portion starting at said inner end and having substantially parallel opposite sides defined by the grain, comprising making a plurality of cuts from one of said opposite ends of the bolt across said width and partially through the bolt to establish the extent of said tip portion and successively separating the shakes from the bolt to splitting along the grain starting from the inner end of the cuts and passing through the bolt to the opposite end, whereby each successive shake has a split weather portion of substantially parallel opposite sides defined by the grain.*

*14. The method of claim 13, said step of making said plurality of cuts includes making all of the cuts prior to splitting.*

*15. The method of claim 13, said step of making said plurality of cuts includes making said cuts individually and successively and said step of separating the shakes from the bolt includes splitting after the formation of each cut and before the formation of the next successive cut.*

* * * * *